United States Patent
Nomura et al.

(10) Patent No.: US 8,019,209 B2
(45) Date of Patent: Sep. 13, 2011

(54) OPTICAL AXIS CORRECTION APPARATUS OF AN IMAGING DEVICE, AND OPTICAL AXIS CORRECTION METHOD FOR AN IMAGING DEVICE

(75) Inventors: Hiroshi Nomura, Saitama (JP); Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 845 days.

(21) Appl. No.: 11/536,960

(22) Filed: Sep. 29, 2006

(65) Prior Publication Data

US 2007/0077047 A1    Apr. 5, 2007

(30) Foreign Application Priority Data

Sep. 30, 2005 (JP) ................. P2005-288609

(51) Int. Cl.
  *G03B 17/00* (2006.01)
(52) U.S. Cl. ............... 396/55; 348/208.11; 359/557
(58) Field of Classification Search ............ 396/55; 348/208.11; 359/557
  See application file for complete search history.

(56) References Cited

U.S. PATENT DOCUMENTS

| | | | | |
|---|---|---|---|---|
| 5,140,357 | A * | 8/1992 | Suda et al. | 396/82 |
| 5,721,641 | A * | 2/1998 | Aoki | 359/557 |
| 2002/0060739 | A1* | 5/2002 | Kitamura et al. | 348/222 |
| 2003/0197787 | A1* | 10/2003 | Satoh et al. | 348/208.1 |
| 2004/0100561 | A1* | 5/2004 | Shinohara et al. | 348/208.1 |
| 2004/0239785 | A1* | 12/2004 | Nanjo et al. | 348/294 |
| 2005/0140793 | A1* | 6/2005 | Kojima et al. | 348/208.99 |
| 2005/0285949 | A1* | 12/2005 | Ogawa et al. | 348/208.99 |
| 2006/0051081 | A1* | 3/2006 | Ogino | 396/55 |
| 2006/0140611 | A1* | 6/2006 | Kuwakino | 396/91 |

FOREIGN PATENT DOCUMENTS

| | | |
|---|---|---|
| JP | 6-296252 | 10/1994 |
| JP | 9-181340 | 7/1997 |
| JP | 2004-1658 | 1/2004 |

OTHER PUBLICATIONS

Translation of JP Publication No. 2006-191181; Title: Imaging Device, It's Control Method, and Its Control Program; Inventor Nagai, Hiroshi; Publication Date: Jul. 20, 2006.*
English language abstract of JP 6-296252, Publication Date: Oct. 21, 1994.
English language abstract of JP 9-181340, Publication Date: Jul. 11, 1997.
English language abstract of JP 2004-1658, Publication Date: Jan. 8, 2004.
U.S. Appl. No. 11/550,063 to Nomura et al., which was filed on Oct. 17, 2006.

* cited by examiner

*Primary Examiner* — W. B. Perkey
*Assistant Examiner* — Fang-Chi Chang
(74) *Attorney, Agent, or Firm* — Greenblum & Bernstein, P.L.C.

(57) ABSTRACT

An optical axis correction apparatus of an imaging device, the imaging device including an imaging optical system having a plurality of optical elements, and an optical element position changing device which changes a relative position among the optical elements to vary a state of an object image formed thereby, the optical axis correction apparatus including an optical element moving device which moves at least one of the optical elements in a plane orthogonal to an optical axis; a memory which stores data relating to a deviation of the object image position in directions orthogonal to the optical axis, the deviation occurring when the optical element position changing device changes the relative position among the optical elements; and an object image position correction controller which drives the optical element moving device based on the data stored in the memory to correct said deviation of the object image position.

20 Claims, 9 Drawing Sheets

OPTICAL AXIS CORRECTION APPARATUS OF AN IMAGING DEVICE, AND OPTICAL AXIS CORRECTION METHOD FOR AN IMAGING DEVICE

BACKGROUND OF THE INVENTION

1. Field of the Invention

The present invention relates an optical axis correction apparatus of an imaging device and a method of correcting an optical axis position of an imaging device.

2. Description of the Prior Art

In imaging devices such as cameras, changing the state (e.g., a magnification) of an object image (an image picked up by an imaging device) by changing the relative position among a plurality of optical elements of an imaging optical system (e.g., a photographing optical system) is one of the most frequent operations performed in imaging devices. Although various such operations for changing the state of an object image are known, a zooming operation in a zoom lens and an insertion/removal operation of a wide-converter lens or a macro lens into/from an optical path on an optical axis are examples of such operations.

In general, if the relative positions of a plurality of optical elements of an optical system are changed, sometimes a deviation (eccentricity) of the optical axis of the optical system, from the original position in a direction orthogonal to the optical axis, occurs at the positions of each optical element (unique to each optical element). It is extremely difficult to eliminate such an optical axis deviation to perfection even if the positioning accuracy of each location of occurrence is enhanced.

SUMMARY OF THE INVENTION

The present invention provides an optical axis correction apparatus of an imaging device which is configured to be capable of easily correcting a deviation of the optical axis of an optical system from the original position in a direction orthogonal to the optical axis, wherein the deviation occurs when the relative positions among a plurality of optical elements of the optical system is changed. The present invention further provides a method of correcting such a deviation.

According to an aspect of the present invention, an optical axis correction apparatus of an imaging device, the imaging device including an imaging optical system having a plurality of optical elements, and an optical element position changing device which changes a relative position among the plurality of optical elements to vary a state of an object image formed via the imaging optical system, the optical axis correction apparatus including at least one optical element moving device which moves at least one of the plurality of optical elements in a plane orthogonal to an optical axis; a memory which stores data relating to a deviation of the object image position in directions orthogonal to the optical axis, the deviation occurring when the optical element position changing device changes the relative position among the plurality of optical elements; and an object image position correction controller which drives the optical element moving device based on the data stored in the memory in accordance with an operation of the optical element position changing device to correct the deviation of the object image position.

The optical element position changing device can be a zoom mechanism which changes the distance between at least two of the plurality of optical elements on the optical axis to vary focal length of the imaging optical system.

The optical element position changing device can be an insertion/removal drive mechanism which moves a removable optical element included in the imaging optical system from a position on the optical axis to a position away from the optical axis.

It is desirable for the optical axis correction controller to perform the optical axis correction operation, in which the optical axis correction controller drives the optical element moving device based on the data stored in the memory in accordance with the operation of the optical element position changing device, upon completion of an operation of the optical element position changing device.

It is desirable for the one of the plurality of optical elements, which is moved by the optical element moving device in the plane orthogonal to the optical axis, to be an image sensor.

It is desirable for the optical axis correction apparatus to include an image shake correction controller which drives the optical element moving device to move the at least one of the plurality of optical elements in the plane orthogonal to the optical axis in accordance with a direction and magnitude of vibration applied to the imaging optical system to cancel image shake of an object image on an imaging surface.

It is desirable for an image shake correction capability to be selectively turned ON and OFF, and for the image shake correction controller to also utilize the data stored in the memory when determining an amount of driving of the one of the plurality of optical elements necessary for canceling the image shake when the image shake correction capability has been turned ON.

It is desirable for the imaging device to be a digital camera.

In an embodiment, an imaging device is provided, including an imaging optical system having a plurality of optical elements an optical element position changing device which changes relative position among the plurality of optical elements; at least one optical element moving device which moves at least one of the plurality of optical elements in a plane orthogonal to an optical axis; a memory which stores data relating to a deviation of the object image position in directions orthogonal to the optical axis, the deviation occurring when the optical element position changing device changes the relative position among the plurality of optical elements; and a controller which drives the optical element moving device based on the data stored in the memory in accordance with an operation of the optical element position changing device to correct the deviation of the object image position.

In an embodiment, an optical axis correction apparatus of an imaging device is provided, the imaging device including an imaging optical system having a plurality of optical elements, and an optical element position changing device which changes a relative position among the plurality of optical elements to vary a state of an object image formed via the imaging optical system, the optical axis correction apparatus including an image shake correction device which moves a shake correction optical element included in the imaging optical system in a plane orthogonal to an optical axis in accordance with a direction and magnitude of vibration applied to the imaging optical system to cancel image shake of an object image on an imaging surface; a memory which stores data relating to a deviation of the object image position in directions orthogonal to the optical axis, the deviation occurring when the optical element position changing device changes the relative position among the plurality of optical elements; and an optical axis correction controller which reads out the data from the memory in accordance with an operation of the optical element position changing device and drives the shake correction optical element to a position where the deviation of the object image position is adjusted.

In an embodiment, an optical axis correction method for an imaging device is provided, the imaging device including an imaging optical system having a plurality of optical elements; an optical element position changing device which changes a relative position among the plurality of optical elements to vary a state of an object image formed via the imaging optical system; and at least one optical element moving device which moves at least one of the plurality of optical elements in a plane orthogonal to an optical axis, the optical axis correction method including measuring data of deviation of the object image position in directions orthogonal to an optical axis of the plurality of optical elements which occurs when the optical element position changing device changes the relative position among the plurality of optical elements; calculating correction-amount data for correcting the object image position deviation by the optical element moving device; storing the correction-amount data in a memory; reading the correction-amount data from the memory in accordance with an operation state of the optical element position changing device; and actuating the optical element moving device to move the one of the plurality of optical elements in the plane orthogonal to the optical axis based on the amount of correction-amount data.

In an embodiment, an optical axis correction method for an imaging device is provided, the imaging device including an imaging optical system having a plurality of optical elements; an optical element position changing device which changes relative position among the plurality of optical elements to vary a state of an object image formed via the imaging optical system; and at least one optical element moving device which moves at least one of the plurality of optical elements in a plane orthogonal to an optical axis, the optical axis correction method including measuring data relating to deviation of said object image position in directions orthogonal to an optical axis of said plurality of optical elements which occurs when said optical element position changing device changes said relative position among said plurality of optical elements, and storing said data in a memory; reading out the data from the memory in accordance with an operation of the optical element position changing device and calculating an amount of deviation of the object image position which is caused by an operation of the optical element moving device; and actuating the optical element moving device to move the one of the plurality of optical elements in the plane orthogonal to the optical axis based on the calculated amount of deviation of the object image position.

According to the present invention, a deviation of the optical axis in a direction orthogonal to the optical axis can be easily corrected.

The present disclosure relates to subject matter contained in Japanese Patent Application No. 2005-288609 (filed on Sep. 30, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
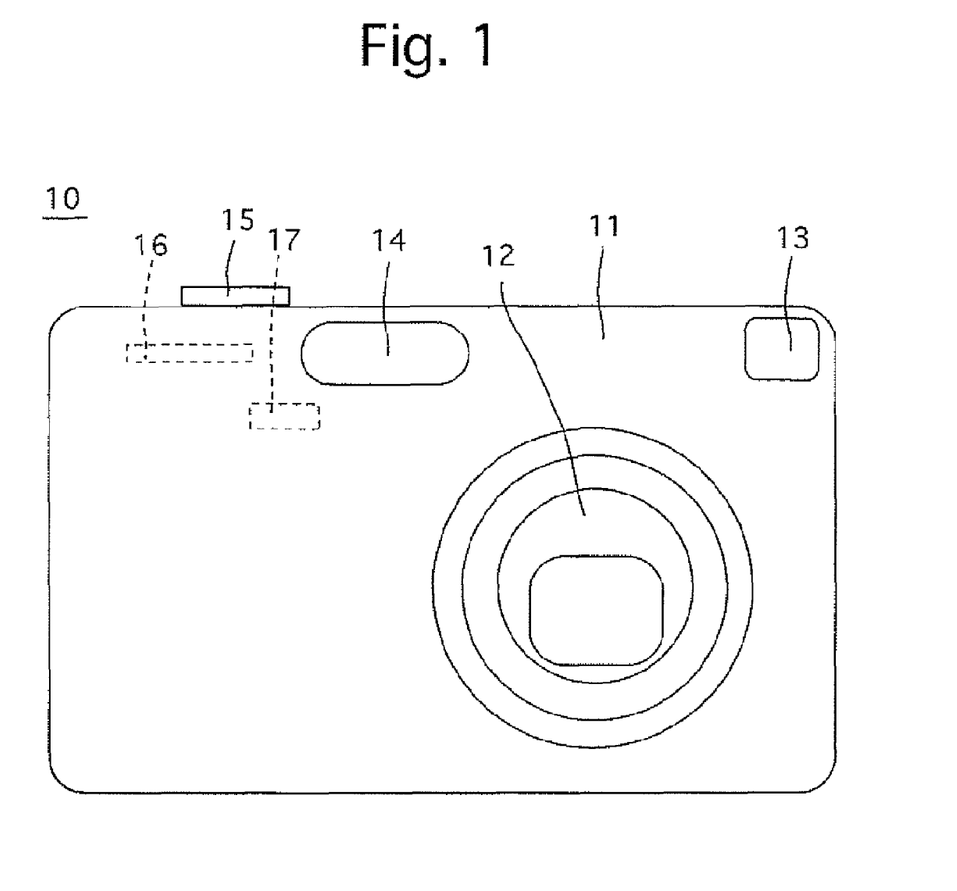
FIG. 1 is a front elevational view of a first embodiment of a digital camera equipped with an optical axis correction apparatus according to the present invention.

FIG. 1 shows a first embodiment of a digital camera (imaging device) equipped with an optical axis correction apparatus according to the present invention. The digital camera 10 is provided on the front thereof with a zoom lens (zoom lens barrel) 12, an optical viewfinder 13 and a flash 14. The digital camera 10 is provided on the top thereof with a shutter release button 15. The digital camera 10 is provided on the back thereof with a zoom switch 16 and a photographic mode selection switch 17.

Figure 2:
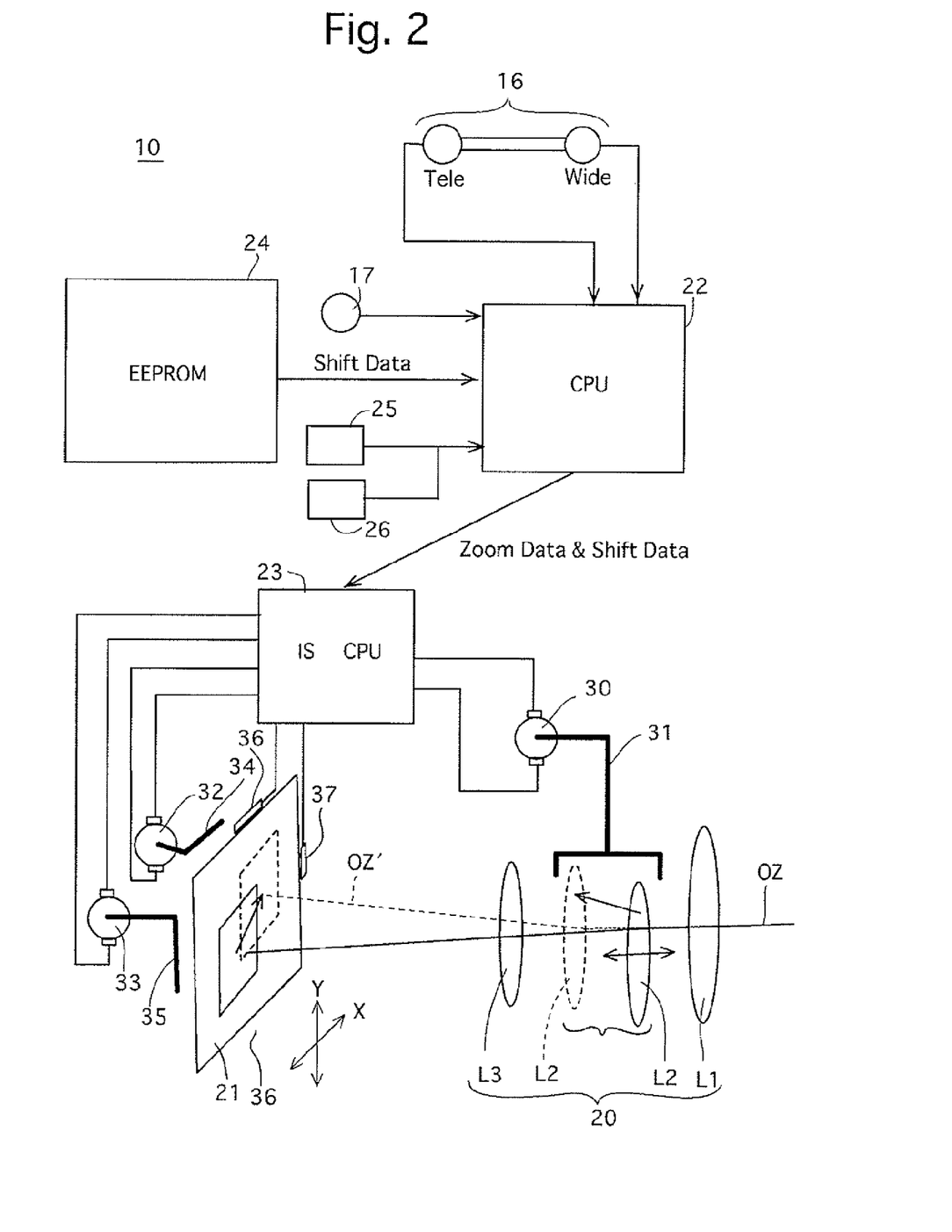
FIG. 2 is a schematic diagram of major elements of the digital camera shown in FIG. 1.

As shown in FIG. 2, the zoom lens 12 is provided with a zoom lens system (photographing optical system) 20 including a plurality of lens groups (first, second and third lens groups) L1, L2 and L3, and an image sensor (shake correction optical element) 21 which is located at a focal point of the zoom lens system 20. The optical axis of the zoom lens system 20 is shown by the letters "OZ" in FIG. 2. The digital camera 10 is provided therein with a main CPU (an element of an optical axis correction controller/an element of an image shake correction controller) 22, a shake correction control CPU (IS CPU/an element of the optical axis correction controller/an element of the image shake correction controller) 23, an EEPROM (memory) 24, an X gyro sensor 25 and a Y gyro sensor 26.

The second lens group L2, which is an element of the zoom lens system 20, is driven by a zoom mechanism (optical element position changing device) 31 including a zoom motor (an element of the optical element position changing device) 30 as a driving source thereof. According to the design of the zoom lens system 20, the second lens group L2 is ideally moved along the optical axis OZ by the zoom mechanism 31 to vary focal length of the zoom lens system 20. Although only the second lens group L2 is moved to vary focal length of the zoom lens system 20 for the purpose of simplification of the description, more than one of the first through third lens groups L1 and L3 can be moved to vary focal length of the zoom lens system 20. The zoom switch 16 is a momentary switch which can be selectively operated between the telephoto side (Tele) and wide-angle side (Wide). Operating the zoom switch 16 to telephoto side and wide-angle side causes the zoom lens system 20 to change to the long focal length side (telephoto extremity) and the short focal length side (wide-angle extremity), respectively.

The digital camera 10 is provided with an anti-shake system (image shake correction device) including an X-direction drive mechanism (first optical element moving device) 34 and a Y-direction moving device (second optical element moving device) 35. The X-direction drive mechanism 34 and the Y-direction drive mechanism 35 are provided with an X-direction motor (an element of the first optical element moving device) 32 and a Y-direction motor (an element of the second optical element moving device) 33, respectively. The image sensor 21 can be moved by the X-direction drive mechanism 34 and the Y-direction drive mechanism 35 in a plane orthogonal to the optical axis OZ. Specifically, the X-direction drive mechanism 34 moves the image sensor 21 linearly in the horizontal direction (X-direction; see FIG. 2) in a plane orthogonal to the optical axis OZ, and the Y-direction drive mechanism 35 moves the image sensor 21 linearly in the vertical direction (Y-direction; see FIG. 2) in a common plane orthogonal to the optical axis OZ.

Note that if the X-direction drive mechanism 34 and the Y-direction drive mechanism 35 are driven at the same time independently, the image sensor 21 can be linearly moved or moved in a curved line as desired.

Deviations of an object image (image shake) on the imaging surface of the image sensor 21 can be corrected (offset) by moving the image sensor 21 in accordance with the direction and magnitude of vibration (shake) applied to the digital camera (the zoom lens system 20) by the X-direction drive mechanism 34 (which includes the X-direction motor 32) and the Y-direction drive mechanism 35 (which includes the Y-direction motor 33).

More specifically, the X gyro sensor 25 detects the angular velocity about the X-axis while the Y gyro sensor 26 detects the angular velocity about the Y-axis. The angular velocity detected by the X gyro sensor 25 and the angular velocity detected by the Y gyro sensor 26 are time-integrated to obtain an angle of movement, and subsequently, an X-direction deviation amount and a Y-direction deviation amount of an object image are calculated from an angle of movement thus obtained, and the amount of driving (moving) of the image sensor 21 and the direction of driving (moving) of the image sensor 21 (i.e., the amount of driving of the X-direction motor 32 and the amount of driving of the Y-direction motor 33) which are necessary for canceling the image shake of the object image are calculated. Subsequently, based on these calculated values, the shake correction control CPU 23 controls driving operations of the X-direction motor 32 and the Y-direction motor 33. This control suppresses (corrects) image shake of an object image picked up by the image sensor 21. The digital camera 10 enters a camera-shake correction mode (image shake correction mode) upon the photographic mode selection switch 17 being turned ON. In a state where the photographic mode selection switch 17 is OFF, the camera-shake correction capability (image shake correction capability) of the digital camera 10 is deactivated, so that a normal photographing operation can be performed.

The second lens group L2 is designed to move along (parallel to) the optical axis OZ of the zoom lens system 20 when the focal length thereof is varied. However, in reality, the second lens group L2 is moved not quite parallel (nearly parallel) to the optical axis OZ, e.g., moved from the position shown by a solid line to the position shown by a broken line as shown in FIG. 2. As a result of this movement, a deviation of the optical axis OZ from the position thereof shown by a solid line (optical axis OZ) to the position shown by a broken line (optical axis OZ') occurs as shown in FIG. 2. Thereupon, the position of an object image formed on the imaging surface of the image sensor 21 deviates from the position shown by a solid line to the position shown by a broken line as shown in FIG. 2. The digital camera 10 can prevent such a deviation of an object image from occurring by driving the image sensor 21 in a direction to counteract the effects of the object image position deviation associated with variations in focal length of the zoom lens system 20, independently from the above described camera-shake correction operation.

Figure 3:
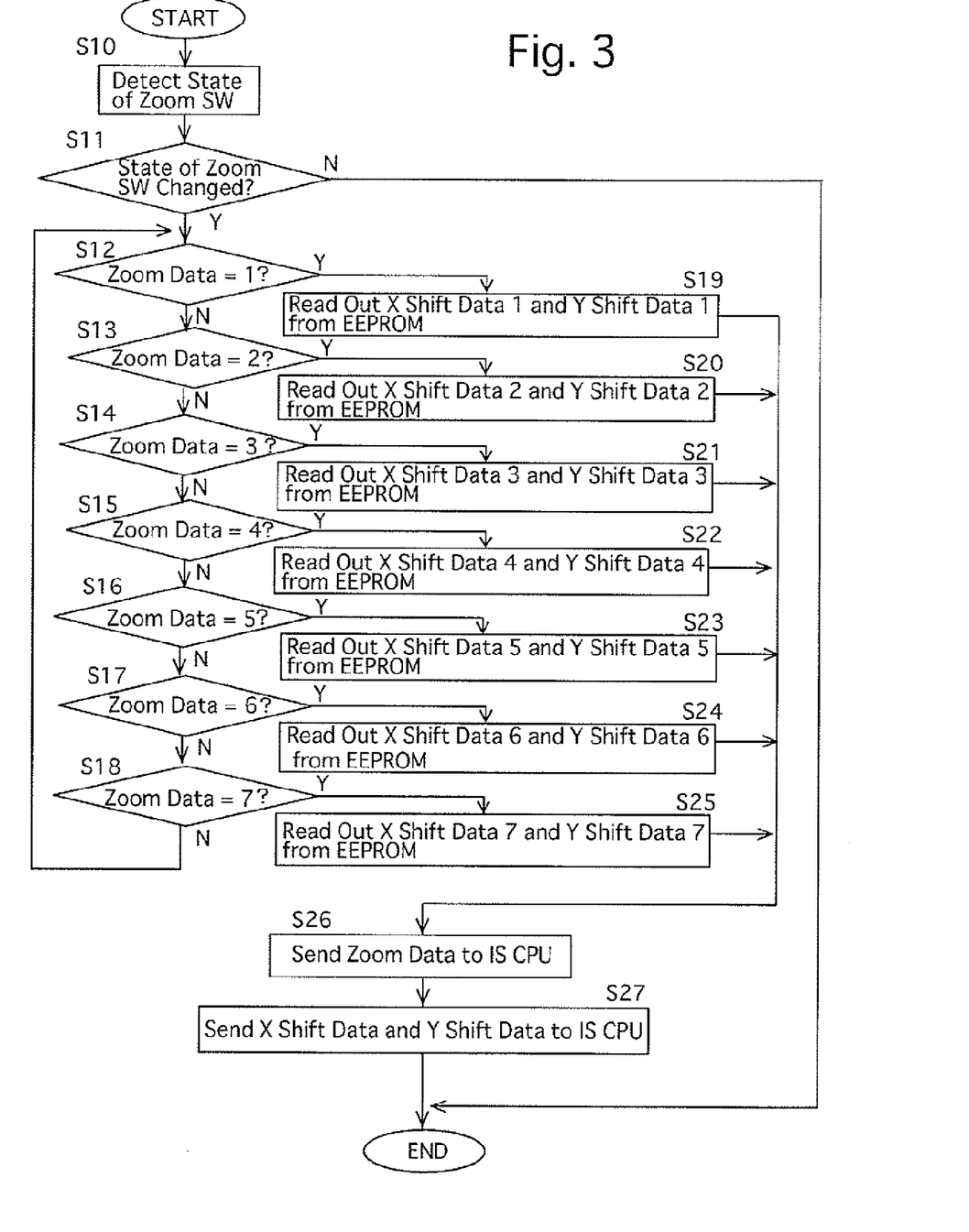
FIG. 3 is a flow chart showing operations of optical axis correction control which are performed by the main CPU in the first embodiment of the digital camera.
Figure 4:
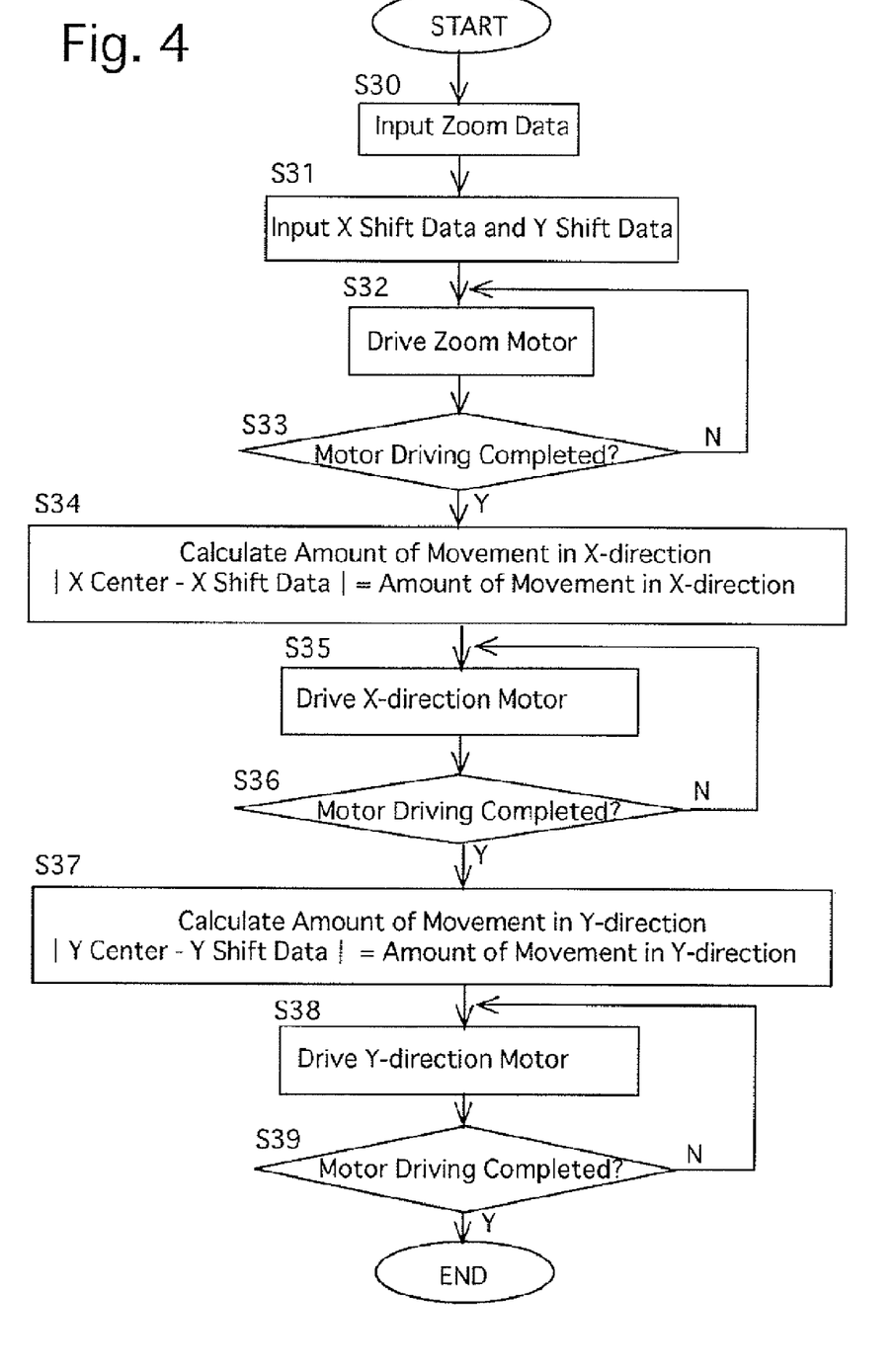
FIG. 4 is a flow chart showing operations of the optical axis correction control operations which are performed by a camera-shake correction control CPU in the first embodiment of the digital camera in a state where the digital camera is not in a camera-shake correction mode.
Figure 5:
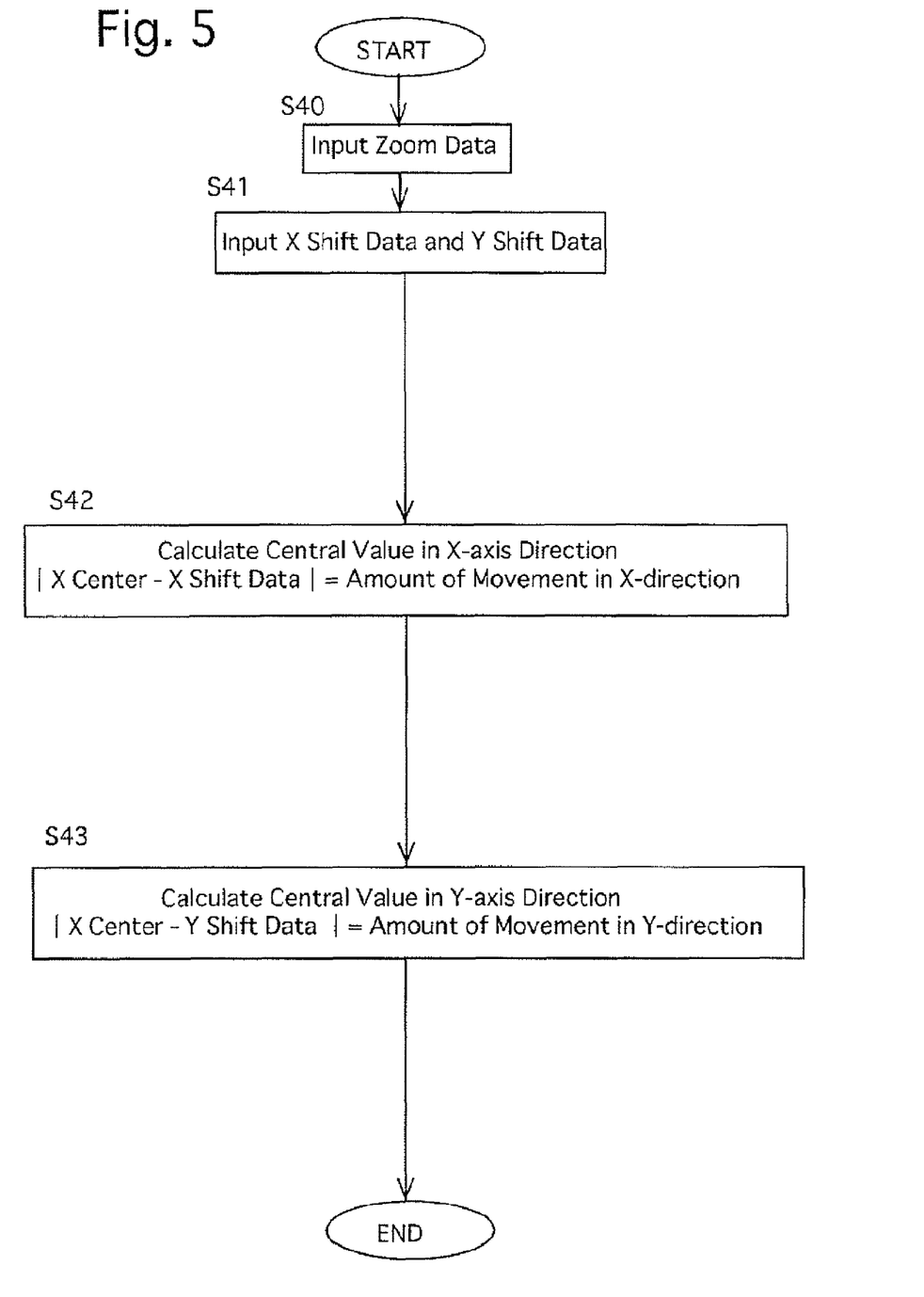
FIG. 5 is a flow chart showing operations of the optical axis correction control which are performed by the camera-shake correction control CPU in the first embodiment of the digital camera in a state where the digital camera is in the camera-shake correction mode.

The flow charts shown in FIGS. 3 through 5 show operations of an optical axis correction control performed in association with variations in focal length of the zoom lens system 20. Note that a precondition of this control is that the variable focal length of the zoom lens system 20 varies stepwise in seven steps in total from wide-angle extremity to telephoto extremity. In FIG. 3, data on these seven focal-length steps are represented by zoom data (Shift Data) 1 through 7, respectively. Specifically, data on the wide-angle extremity is represented by zoom data 1, data on the telephoto extremity is represented by zoom data 7, and the remaining five intermediate focal lengths are represented by zoom data 2 through 6, respectively. In the case where an optical axis of a lens (lens group) is shifted/deviated from the optical axis OZ (determined at the design stage) due to manufacturing error and/or assembly error occurring in the zoom lens system 20, or in the case where the movable lens groups do not move in parallel to the optical axis OZ during zooming, the position at which the actual optical axis OZ' of the zoom lens system 20 intersects the imaging surface of the image sensor 21 can shift from the position determined at the design stage. Additionally, the amount of deviation of the optical axis OZ at each of the seven focal-length steps from wide-angle extremity to telephoto extremity is measured beforehand so that shift data for correcting the deviation of the optical axis OZ at each of the seven focal-length steps is written in the EEPROM 24 in advance. Shift data for each focal-length step is composed of X-shift data (X-direction shift data) that shows an amount of driving of the X-direction motor 32 and Y-shift data (Y-direction shift data) that shows an amount of driving of the Y-direction motor 33. A total of fourteen items of data: data on X-shift data 1 and Y-shift data 1 which correspond to zoom data 1 (telephoto extremity) through data on X-shift data 7 and Y-shift data 7 which corresponds to zoom data 7 (wide-angle extremity) are stored in the EEPROM 24 in advance. Although the number of focal-length steps is seven in the present embodiment of the digital camera for the purpose of illustration, the number of focal-length steps is not limited solely to this particular number.

Note that the seven items of X-shift data and the seven items of Y-shift data are data which are obtained by measuring the distances in the X-direction and the Y-direction from the center of the imaging surface of the image sensor 21 to the actual point of intersection of the optical axis OZ' (of incident light on the optical axis OZ') with the imaging surface of the image sensor 21 for each zoom step during zooming, when the image sensor 21 has been moved to a predetermined reference position (initial position).

In this embodiment, position sensors 36 and 37 are provided, which detect the X-direction position and the Y-direction position, respectively, of the image sensor 21. Although the position sensors 36 and 37 can be constructed so as to only detect the absolute position (initial position) of the image sensor 21, if the position sensors 36 and 37 are constructed so as to detect the absolute positions of the image sensor 21 in the X-direction and the Y-direction over the entire movement range of the image sensor 21, the position of the image sensor 21 upon correction of object image position shift can be accurately set.

In an alternative arrangement, the movement-amount data for moving the object image to the predetermined reference position (initial position) can be stored in the EEPROM 24, so that upon zooming being carried out, movement-amount data corresponding to the zooming position of the zoom lens system 20 is read out from the EEPROM 24 in order to calculate the driving amounts for the X-direction motor 32 and the Y-direction motor 33.

The flow chart shown in FIG. 3 shows operations performed by the main CPU 22. Upon the zoom switch 16 being operated (step S10), it is determined whether the state of the zoom switch 16 has changed (step S11). If it is determined that the state of the zoom switch 16 has not changed (if No at step S11), no displacement of the optical axis OZ has occurred, so that control ends without performing any operation for correcting the position of the optical axis OZ. If it is determined that the state of the zoom switch 16 has changed (if YES at step S11), it is determined whether one of the seven focal-length steps from wide-angle extremity to telephoto extremity has been selected by the operation of the zoom switch 16 (steps S12 through S18). Subsequently, data on X-shift data and Y-shift data which corresponds to the selected focal length (one of seven zoom data 1 through 7) is read out from the EEPROM 24 (steps S19 through S25), and zoom data n, X-shift data n and Y-shift data n are sent to the shake correction control CPU 23 (steps S26 and 27), wherein "n" represents a specified number among the numbers 1 through 7). For instance, if the zoom switch 16 is operated to change the focal length of the zoom lens system 20 to the focal-length step 3 that corresponds to zoom data 3 (if YES at step S14), X-shift data 3 and Y-shift data 3 are read out from the EEPROM 24 (step S21).

The shake correction control CPU 23 drives the zoom motor 30 based on the input zoom data n to change the focal length of the zoom lens system 20. Additionally, the shake correction control CPU 23 drives the X-direction motor 32 and the Y-direction motor 33 based on the input X-shift data and Y-shift data to correct a deviation of the optical axis OZ which occurred during the variation in focal length of the zoom lens system 20. The digital camera 10 enters and exits from the camera-shake correction mode by turning ON and OFF the photographic mode selection switch 17 in the present embodiment of the digital camera 10. The digital camera 10 is controlled in different manners depending on the ON/OFF state of the photographic mode selection switch 17, i.e., depending on whether the camera-shake correction mode is selected.

FIG. 4 shows operations of optical axis correction control which are performed by the camera-shake correction control CPU 23 in a state where the digital camera 10 is not in the camera-shake correction mode. Firstly, zoom data n, X-shift data n and Y-shift data n which are output from the main CPU 22 at steps S26 and S27 are input to the shake correction control CPU 23 (steps S30 and S31), so that the shake correction control CPU 23 drives the zoom motor 30 based on the input zoom data n (step S32). Thereupon, the second lens group L2 moves in the optical axis direction to vary the focal length of the zoom lens system 20. Immediately after the zoom motor 30 is stopped upon the focal length of the zoom lens system 20 reaching the set focal length (if YES at step S33), an amount of movement in the X-direction necessary for object image position correction is calculated at step S34. Subsequently, the X-direction motor 32 is driven to move the image sensor 21 in the X-direction by an amount corresponding to the calculated amount of movement in the X-direction (step S35). Upon completion of this driving of the X-direction motor 32 (if YES at step S36) an amount of movement in the Y-direction necessary for object image position correction is calculated at step S37. Subsequently, the Y-direction motor 33 is driven to move the image sensor 21 in the Y-direction by an amount corresponding to the calculated amount of movement in the Y-direction (step S38). Upon completion of this driving of the Y-direction motor 33 (if YES at step S39), the optical axis correction control ends. According to the above described operations performed by the camera-shake correction control CPU 23, the optical axis OZ can be prevented from deviating from the original position (position designated at the design stage) even if the focal length of the zoom lens system 20 varies.

Note that in the case where the X-direction motor 32 and the Y-direction motor 33 has already being driven based on shift data before control enters step S30 of this flowchart, the difference in the shift data before the X-direction and Y-direction motors 32 and 33 were driven and the current shift data is obtained in the calculation operations in steps S34 and S37, and the amount of driving of the X-direction motor 32 and the Y-direction motor 33 is calculated based on this difference. However, if the image sensor 21 is positioned at the initial position, the amount of driving of the X-direction motor 32 and the Y-direction motor 33 is calculated based on the current shift data.

FIG. 5 shows operations of the optical axis correction control which are performed by the camera-shake correction control CPU 23 in a state where the digital camera 10 is in the camera-shake correction mode. Similar to the case shown in FIG. 4 where the digital camera 10 is not in the camera-shake correction mode, zoom data n, X-shift data n and Y-shift data n which are output from the main CPU 22 at steps S26 and S27 are input to the shake correction control CPU 23 (steps S40 and 41). In a state where the digital camera 10 is not in the camera-shake correction mode (in the case shown in FIG. 4), the image sensor 21 is moved solely for the purpose of correcting a deviation of the optical axis OZ which is caused by variation of the focal length of the zoom lens system 20, and accordingly, the image sensor 21 only has to be stopped until a subsequent change of the focal length of the zoom lens system 20 after the image sensor 21 has been moved to a position where the deviation of the optical axis OZ is adjusted.

On the other hand, in a state where the digital camera 10 is in the camera-shake correction mode (in the case shown in FIG. 5), the image sensor 21 is moved for the purpose of camera-shake correction whenever camera shake is detected, and accordingly, an object image position deviation caused by variation of the focal length of the zoom lens system 20 can be corrected simultaneously with image shake correction by calculating the amount of movement of the image sensor 21 for image shake correction in each of the X-direction and the Y-direction with the aforementioned X-shift data n and Y-shift data n (steps S42 and S43) when this amount of movement of the image sensor 21 is calculated. In other words, when the image sensor 21 is driven in the X-Y axis directions to correct image shake, the image sensor 21 is moved by an amount of movement including an amount of movement for correction of an object image position deviation caused by variation of the focal length of the zoom lens system 20. Namely, in the case where the digital camera 10 is in the camera-shake correction mode wherein camera-shake correction is carried out whenever camera shake is detected, if the focal length changes, correction of object image position deviation and camera-shake correction can be simultaneously carried by adding once the difference in the shift data (the X-shift data n and the Y-shift data n) before and after the focal length change to the amount of movement for correcting camera shake.

In the case where the camera is in a camera-shake correction mode which carries out camera-shake correction only during a time of exposure, the operations of FIG. 4 are carried out as in the case where camera-shake correction is not carried out, and the amount of movement of the image sensor 21 for camera-shake correction is obtained based on the position of the image sensor 21 after the operations of FIG. 4 are carried out, and the image sensor 21 is moved back to the position after a completion of an exposure.

Although the above described embodiment of the optical axis correction apparatus is of a type which corrects a deviation of the optical axis of a zoom lens system which is caused by variation of the focal length of the zoom lens system, a zooming operation is not the only cause of deviating optical elements of the zoom lens system from the optical axis relative to one another in directions orthogonal to the optical axis. There is a possibility of this sort of positional deviation occurring in basically any imaging device in which the relative position among a plurality of optical elements is changed to give some change to an object image.

FIGS. 6 through 9 show a second embodiment of the digital camera equipped with an optical axis correction apparatus according to the present invention, wherein the optical axis correction apparatus includes an insertable/retractable optical element. In FIGS. 6 through 9, elements and parts of the second embodiment of the digital camera which are similar to those of the first embodiment of the digital camera are designated by the same reference numerals and the description of the same elements and parts are omitted from the following descriptions.

Figure 6:
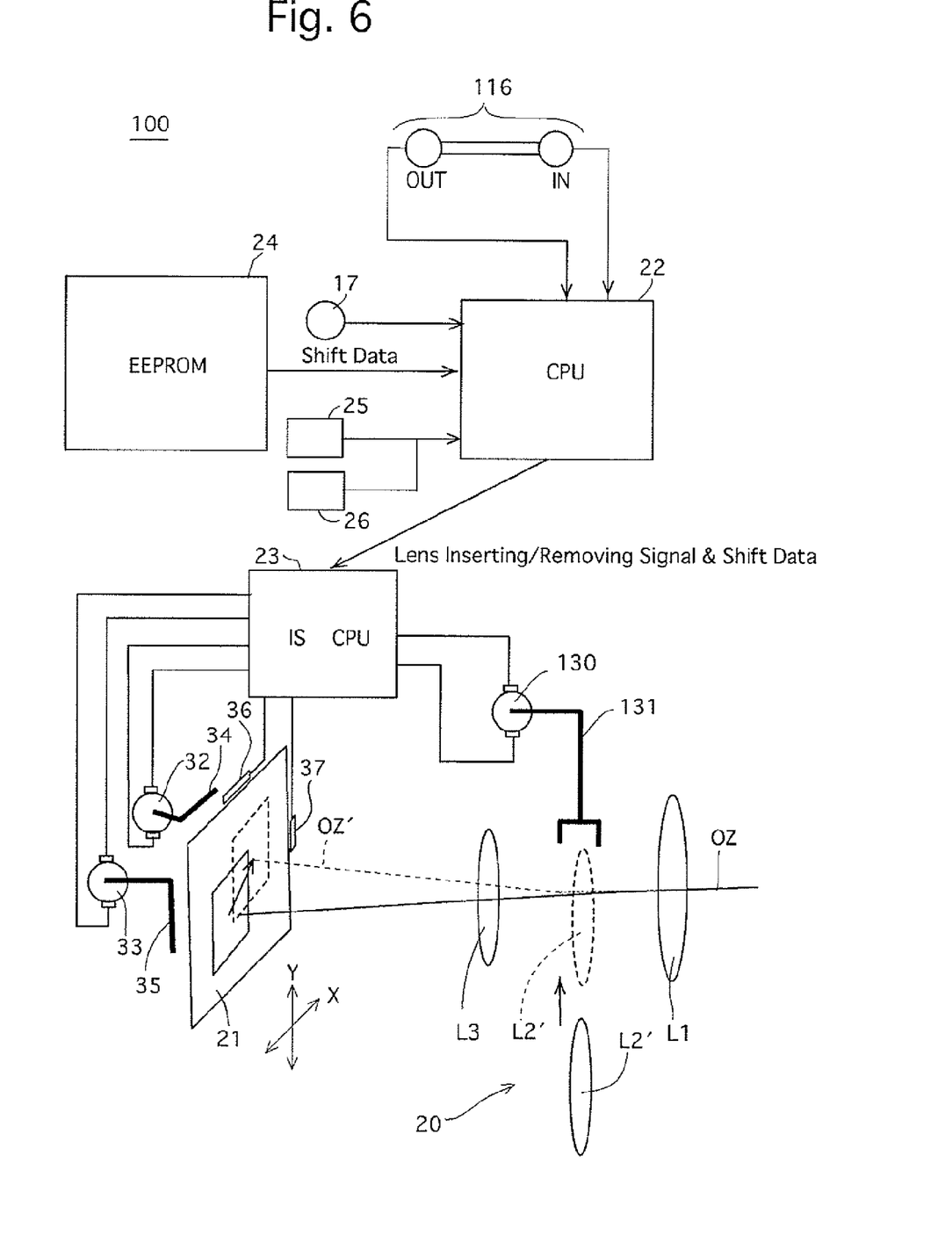
FIG. 6 is a schematic diagram of elements of a second embodiment of the digital camera equipped with an optical axis correction apparatus according to the present invention.

The digital camera 100 that is shown in FIG. 6 is provided with an insertion/removal switch 116 and an insertion/removal drive mechanism (optical element position changing device) 131 having an insertion/removal motor (an element of the optical element position changing device) 130 as a drive source thereof. In the digital camera 100, the zoom lens system 20 is provided between the first lens group L1 and the second lens group L3 with an insertable/removable second lens group (removable optical element) L2' which can be selectively inserted into and removed from an optical path of the zoom lens system 20 on the optical axis O between the first lens group L1 and the second lens group L3. Upon the insertion/removal switch 116 being operated (pushed) to the insertion (IN) side, the insertable/removable second lens group L2' is inserted into the optical path of the zoom lens system 20 on the optical axis O between the first lens group L1 and the second lens group L3 via the insertion/removal drive mechanism 131. Upon the insertion/removal switch 116 being operated (pushed) to the removal (OUT) side, the insertable/removable second lens group L2' is removed from the same optical path of the zoom lens system 20 on the optical axis O via the insertion/removal drive mechanism 131. Although the insertable/removable second lens group L2' that is positioned between the first lens group L1 and the third lens group L3 serves as an insertable/removable optical element of the zoom lens system 2C in the second embodiment of the digital camera 100 for the sake of expediency, the position of the insertable/removable optical element is not limited solely to this particular position between the first lens group L1 and the third lens group L3. In addition, the function of the insertable/removable optical element is optional. Namely, the insertable/removable optical element can be any optical element (e.g., a wide-converter lens or a macro lens) which changes the state (a magnification) of an object image via insertion/removal of the optical element.

Assuming that a deviation of the optical axis OZ from the position thereof shown by a solid line (optical axis OZ) to the position shown by a broken line (optical axis OZ') occurs (as shown in FIG. 6) as a result of the insertion of the insertable/removable second lens group L2' into the position shown by a broke line shown in FIG. 6, the position of an object image formed on the imaging surface of the image sensor 21 deviates from the position shown by a solid line to the position shown by a broken line shown in FIG. 6. The digital camera 100 can prevent such a deviation of an object image from occurring by driving (moving) the image sensor 21 in a direction to counteract the effects of the object image position deviation.

Figure 7:
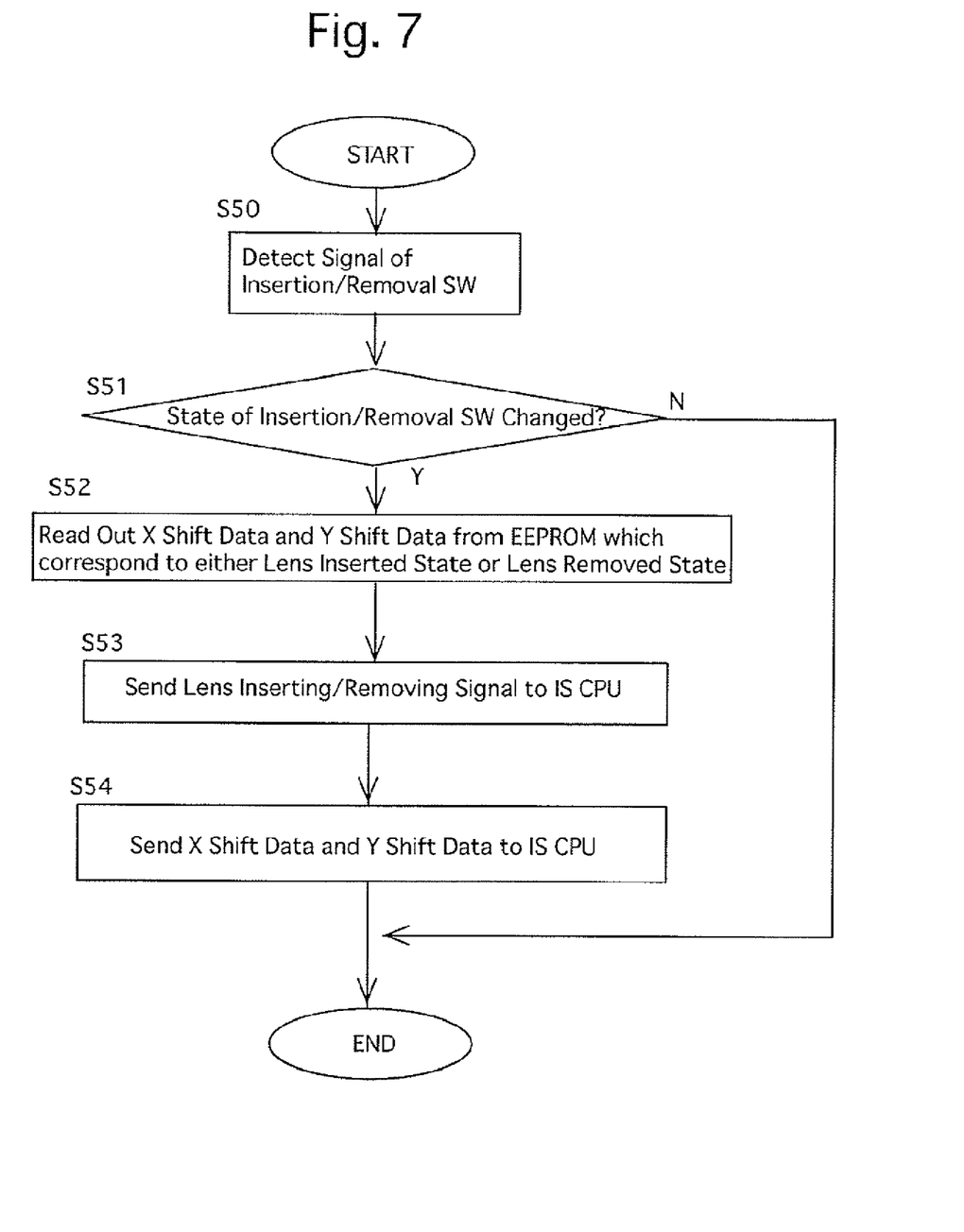
FIG. 7 is a flow chart showing operations of the optical axis correction control which are performed by the main CPU in the second embodiment of the digital camera.

FIG. 7 is a flow chart showing operations of optical axis correction control which are performed by the main CPU 22 in the digital camera 100. As a precondition of this control, the amount of deviation of the optical axis OZ when the insertable/removable second lens group L2' is on the optical axis OZ is measured beforehand so that shift data for correcting the deviation of the optical axis OZ is written in the EEPROM 24 in advance. This shift data is composed of X-shift data that indicates an amount of driving of the X-direction motor 32 and Y-shift data that indicates an amount of driving of the Y-direction motor 33.

Upon an actuating signal of the insertion/removal switch 116 being input to the main CPU 22 (step S50), it is determined whether the state of the insertion/removal switch 116 has changed (step S51). If it is determined that the state of the insertion/removal switch 116 has not changed (if NO at step S51), no displacement of the optical axis OZ has occurred, so that control ends without performing any operation for correcting the position of the optical axis OZ. If it is determined that the state of the zoom switch 16 has changed (if YES at step S51), data on X-shift data and Y-shift data which correspond to either an inserted state or a removed state of the insertable/removable second lens group L2' is read out of the EEPROM 24 (step S52) to send a lens inserting/removing signal, the X-shift data and the Y-shift data to the shake correction control CPU 23 (steps S53 and S54).

Subsequently, the shake correction control CPU 23 drives the X-direction motor 32 and the Y-direction motor 33 based on the input X-shift data and Y-shift data to correct a deviation of the optical axis OZ which is caused by an insertion/removal operation of the insertable/removable second lens group L2'. This control will be hereinafter discussed with reference to the flow charts shown in FIGS. 8 and 9.

Figure 8:
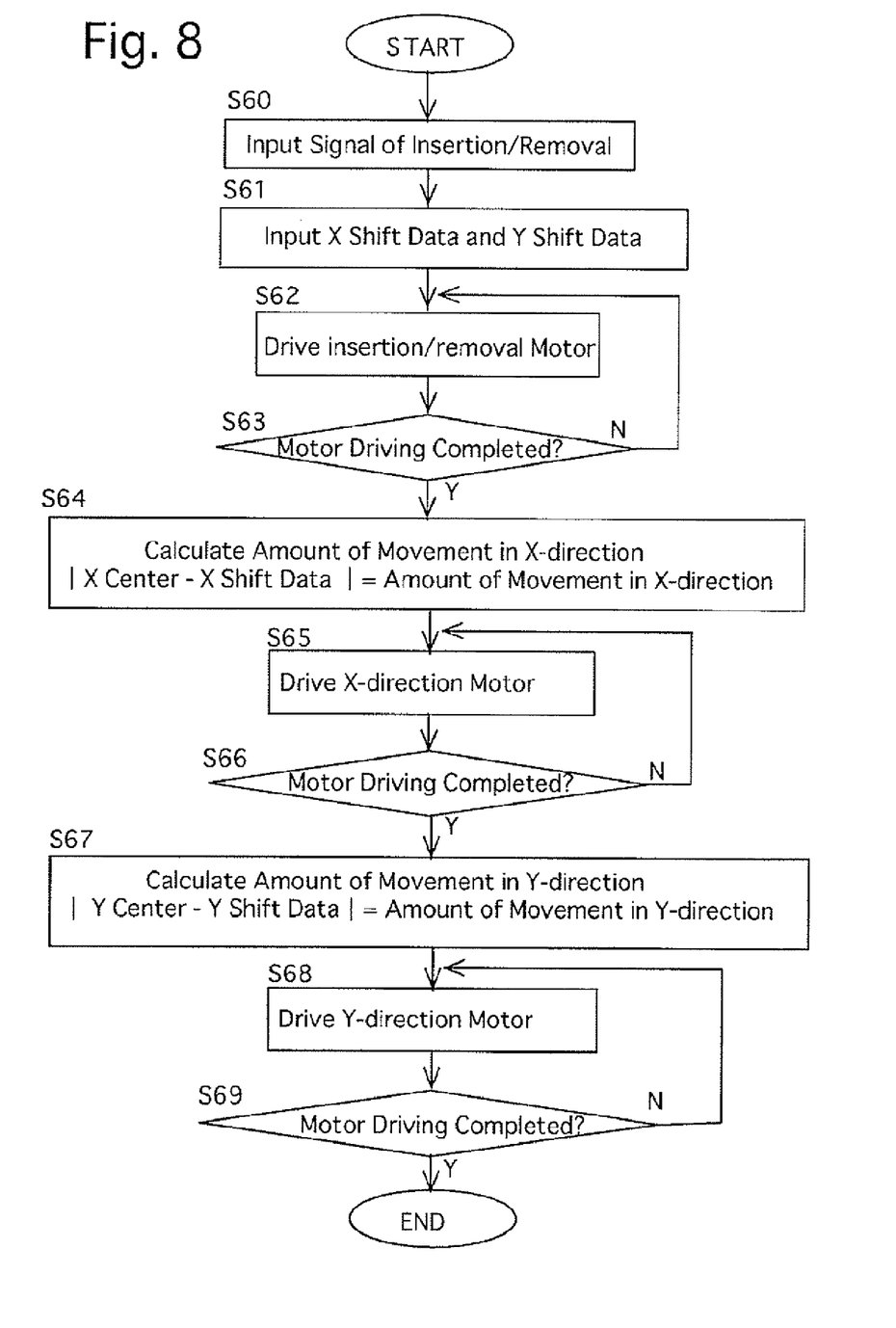
FIG. 8 is a flow chart showing operations of the optical axis correction control which are performed by a camera-shake correction control CPU in the second embodiment of the digital camera in a state where the digital camera is not in a camera-shake correction mode.

FIG. 8 shows operations of optical axis correction control which are performed by the camera-shake correction control CPU 23 in a state where the digital camera 100 is not in the camera-shake correction mode. Firstly, the lens inserting/removing signals the X-shift data and the Y-shift data which are output from the main CPU 22 at steps S53 and S54 are input to the shake correction control CPU 23 (steps S60 and 61), so that the shake correction control CPU 23 drives the insertion/removal motor 130 based on the lens inserting/removing signal (step S62) upon completion of the driving of the insertion/removal motor 130 immediately after the insertable/removable second lens group L2' reaches a predetermined position (if YES at step 63), an amount of movement in the X-direction necessary for object image position correction is calculated at step S64, and subsequently, the X-direction motor 32 is driven to move the image sensor 21 in the X-direction by an amount corresponding to the calculated amount of movement in the X-direction (step S65). Upon completion of the driving of the X-direction motor 32 (if YES at step S66), an amount of movement in the Y-direction necessary for object image position correction is calculated at step S67, and subsequently, the Y-direction motor 33 is driven to move the image sensor 21 in the Y-direction by an amount corresponding to the calculated amount of movement in the Y-direction (step S68). Upon completion of the driving of the Y-direction motor 33 (if YES at step S69), the optical axis correction control ends. According to the above described control, the optical axis OZ can be prevented from deviating from the original position (position designated at the design stage) thereof even in a state where the insertable/removable second lens group L2' is inserted into an optical path on the optical axis OZ.

Figure 9:
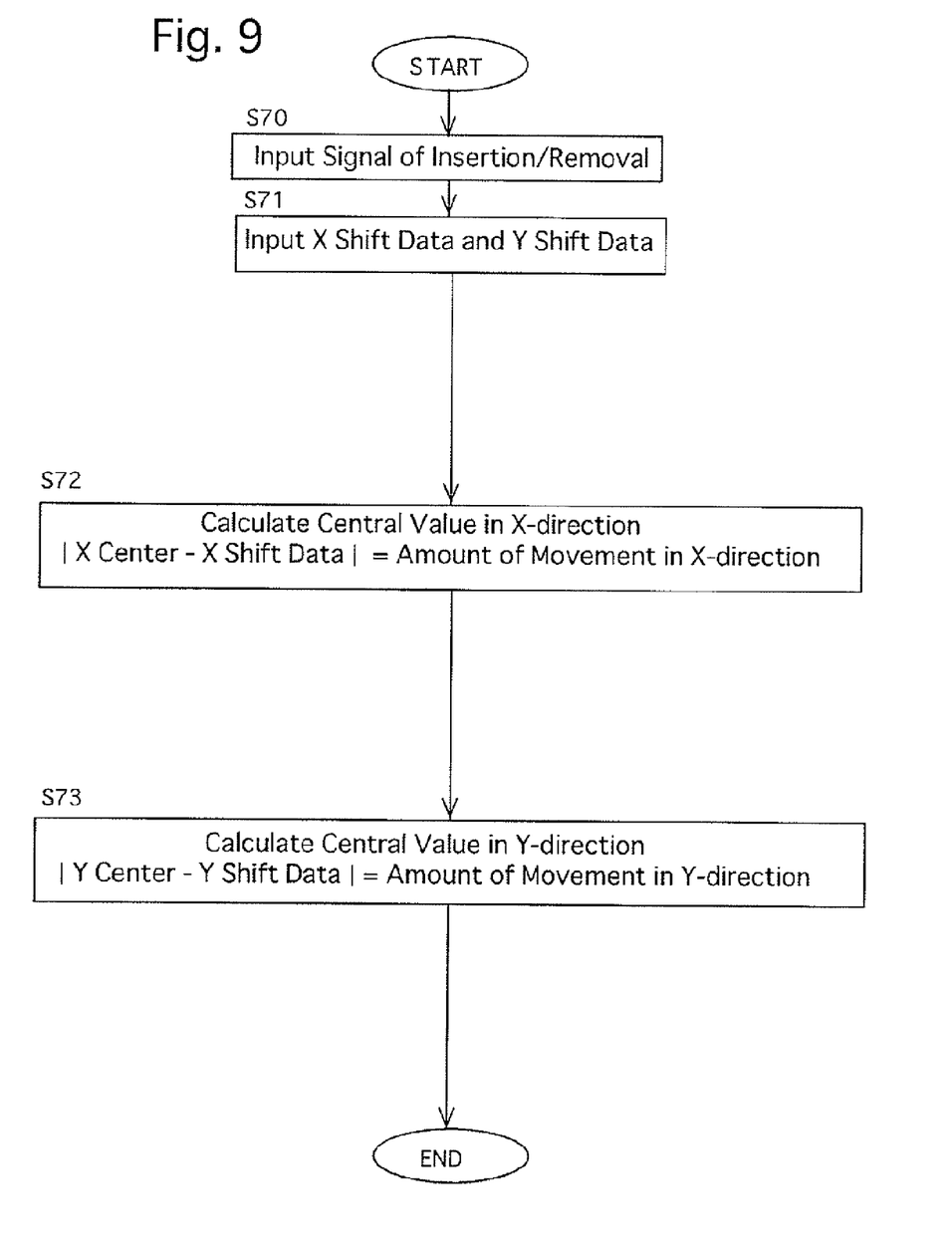
FIG. 9 is a flow chart showing operations of the optical axis correction control which are performed by the camera-shake correction control CPU in the second embodiment of the digital camera in a state where the digital camera is in the camera-shake correction node.

FIG. 9 shows operations of the object image position correction control which are performed by the camera-shake correction control CPU 23 in a state where the digital camera 100 is in the camera-shake correction mode. Similar to the case shown in FIG. 8 where the digital camera 100 is not in the camera-shake correction mode, the lens inserting/removing signal, the X-shift data and the Y-shift data which are output from the main CPU 22 at steps S53 and S54 are input to the shake correction control CPU 23 (steps S70 and 71). In a state where the digital camera 100 is not in the camera-shake correction mode (in the case shown in FIG. 8), the image sensor 21 is moved solely for the purpose of correcting a deviation of the optical axis OZ which is caused by an insertion/removal operation of the insertable/removable second lens group L2', and accordingly, the image sensor 21 only has to be stopped until the subsequent change of the focal length of the zoom lens system 20 after the image sensor 21 has been moved to a position where the deviation of the optical axis OZ is adjusted. On the other hand, in a state where the digital camera 100 is in the camera-shake correction mode (in the case shown in FIG. 9), the image sensor 21 is moved for the purpose of camera-shake correction whenever camera shake is detected, and accordingly, an optical axis deviation caused by variation of the focal length of the zoom lens system 20 can be corrected simultaneously with image shake correction by calculating an amount of movement of the image sensor 21 for image shake correction with the aforementioned X-shift data n and Y-shift data n (steps S72 and S73) when this amount of movement (central value) of the image sensor 21 is calculated. In other words, when the image sensor 21 is driven (moved) in the X-Y axis directions to correct image shake, the image sensor 21 is moved by an amount of movement including an amount of movement for correcting an object image position deviation caused by an insertion/removal operation of the insertable/removable second lens group L2'.

As can be understood from the foregoing, according to an optical axis correction apparatus of an imaging device and a method of correcting an optical axis position of an imaging device to which the present invention is applied, a deviation of the optical axis of an imaging optical system can be easily corrected when a zooming operation or an optical element insertion/removal operation is carried out. Specifically, it is not necessary to provide any independent device for correction of an optical axis deviation since it is corrected using the image shake correcting apparatus, which contributes to a simplification of the imaging device (camera) and enhancement of cost performance.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical axis correction apparatus of an imaging device, said imaging device including an imaging optical system having a plurality of optical elements, and a first actuator which constitutes an optical element position changing device and which changes a relative position among said plurality of optical elements to vary a state of an object image formed via said imaging optical system, said optical axis correction apparatus comprising:

a second actuator, distinct from said first actuator, which constitutes an optical element moving device and which moves at least one of said plurality of optical elements in a plane orthogonal to an optical axis;

a memory including prestored data relating to a deviation of said object image position in directions orthogonal to said optical axis, said deviation resulting from said first actuator changing said relative position among said plurality of optical elements;

an optical axis correction controller which drives said second actuator, based on said data relating to said deviation of said object image position prestored in said memory in accordance with an operation of said first actuator, to correct said deviation of said object image position that occurs when said first actuator changes said relative position among said plurality of optical elements; and an image shake correction controller which drives said second actuator to move said at least one of said plurality of optical elements in said plane orthogonal to said optical axis in accordance with a direction and magnitude of vibration applied to said imaging optical system to cancel image shake of an object image on an imaging surface.

2. The optical axis correction apparatus according to claim 1,
wherein said optical element position changing device comprises a zoom mechanism which changes a distance between at least two of said plurality of optical elements on said optical axis to vary a focal length of said imaging optical system.

3. The optical axis correction apparatus according to claim 1,
wherein said optical element position changing device comprises an insertion/removal drive mechanism which moves a removable optical element included in said imaging optical system from a position on said optical axis to a position away from said optical axis.

4. The optical axis correction apparatus according to claim 1,
wherein said optical axis correction controller performs said optical axis correction operation, in which said optical axis correction controller drives said second actuator based on said data prestored in said memory in accordance with said operation of said first actuator, upon completion of an operation of said first actuator.

5. The optical axis correction apparatus according to claim 1, wherein said one of said plurality of optical elements, which is moved by said second actuator in said plane orthogonal to said optical axis, comprises an image sensor.

6. The optical axis correction apparatus according to claim 1,
wherein an image shake correction capability can be selectively turned ON and OFF, and
wherein said image shake correction controller also utilizes said data prestored in said memory when determining an amount of driving of said one of said plurality of optical elements necessary for canceling said image shake when said image shake correction capability has been turned ON.

7. The optical axis correction apparatus according to claim 1,
wherein said imaging device comprises a digital camera.

8. An imaging device, comprising:
an imaging optical system having a plurality of optical elements;
a first actuator which constitutes an optical element position changing device and which changes a relative position among said plurality of optical elements to vary a state of an object image formed by said imaging optical system;
a second actuator, distinct from said first actuator, which constitutes an optical element moving device and which moves at least one of said plurality of optical elements in a plane orthogonal to an optical axis;
a memory which includes prestored data relating to a deviation of said object image position in directions orthogonal to said optical axis, said deviation resulting from said first actuator changing said relative position among said plurality of optical elements;
a controller which drives said second actuator based on said data relating to a deviation of said object image position in directions orthogonal to said optical axis prestored in said memory in accordance with an operation of said first actuator to correct said deviation of said object image position; and
an image shake correction controller which drives said second actuator to move said at least one of said plurality of optical elements in said plane orthogonal to said optical axis in accordance with a direction and magnitude of vibration applied to said imaging optical system to cancel image shake of an object image on an imaging surface.

9. The optical axis correction apparatus according to claim 8,
wherein said optical element position changing device comprises a zoom mechanism which changes a distance between at least two of said plurality of optical elements on said optical axis to vary a focal length of said imaging optical system.

10. The optical axis correction apparatus according to claim 8,
wherein said optical element position changing device comprises an insertion/removal drive mechanism which moves a removable optical element included in said imaging optical system from a position on said optical axis to a position away from said optical axis.

11. The optical axis correction apparatus according to claim 8,
wherein said controller performs said optical axis correction operation, in which said controller drives said second actuator based on said data prestored in said memory in accordance with said operation of said first actuator, upon completion of an operation of said first actuator.

12. The optical axis correction apparatus according to claim 8, wherein said one of said plurality of optical elements, which is moved by said second actuator in said plane orthogonal to said optical axis, comprises an image sensor.

13. The optical axis correction apparatus according to claim 8,
wherein an image shake correction capability can be selectively turned ON and OFF, and wherein said image shake correction controller also utilizes said data prestored in said memory when determining an amount of driving of said one of said plurality of optical elements necessary for canceling said image shake when said image shake correction capability has been turned ON.

14. The optical axis correction apparatus according to claim 8,
wherein said imaging device comprises a digital camera.

15. An optical axis correction method for an imaging device, the imaging device including an imaging optical system having a plurality of optical elements; a first actuator which constitutes an optical element position changing device and which changes a relative position among the plurality of optical elements to vary a state of an object image formed via the imaging optical system; and a second actuator, distinct from the first actuator, which constitutes the optical element moving device and which moves at least one of the plurality of optical elements in a plane orthogonal to an optical axis, the optical axis correction method comprising:
measuring data of deviation of the object image position in directions orthogonal to an optical axis of the plurality of optical elements, the deviation resulting from the first actuator changing the relative position among the plurality of optical elements;
calculating correction-amount data for correcting the object image position deviation by the second actuator;
storing the correction-amount data in a memory prior to an operation of the imaging device;
reading the correction-amount data from the memory in accordance with an operation state of the first actuator;
actuating the second actuator to move the one of the plurality of optical elements in the plane orthogonal to the optical axis based on the amount of correction-amount data; and
driving the second actuator to move the at least one of the plurality of optical elements in the plane orthogonal to the optical axis in accordance with a direction and magnitude of vibration applied to the imaging optical system to cancel image shake of an object image on an imaging surface.

16. The optical axis correction apparatus according to claim 15,
wherein the second actuator is actuated, based on the amount of correction amount data, upon completion of an operation of the first actuator.

17. The optical axis correction apparatus according to claim 15,
wherein the driving of the second actuator can be selectively turned ON and OFF, and
wherein the driving of the second actuator also utilizes the data stored in the memory when determining an amount of driving of the one of the plurality of optical elements necessary for canceling the image shake, when the driving of the second actuator has been turned ON.

18. An optical axis correction method for an imaging device, the imaging device including an imaging optical system having a plurality of optical elements; a first actuator which constitutes an optical element position changing device and which changes a relative position among the plurality of optical elements to vary a state of an object image formed via the imaging optical system; and a second actuator, distinct from the first actuator, which constitutes an optical element moving device and which moves at least one of the plurality of optical elements in a plane orthogonal to an optical axis, the optical axis correction method comprising:

measuring data of deviation of the object image position in directions orthogonal to an optical axis of the plurality of optical elements which results from the first actuator changing the relative position among the plurality of optical elements, and storing the data in a memory prior to an operation of the imaging device;

reading out the data from said memory in accordance with an operation of the first actuator and calculating an amount of deviation of the object image position which is caused by an operation of the second actuator;

actuating the second actuator to move said one of the plurality of optical elements in the plane orthogonal to the optical axis based on the calculated amount of deviation of the object image position; and driving the second actuator to move the at least one of the plurality of optical elements in the plane orthogonal to the optical axis in accordance with a direction and magnitude of vibration applied to the imaging optical system to cancel image shake of an object image on an imaging surface.

19. The optical axis correction apparatus according to claim 18,
wherein the second actuator is actuated, based on the calculated amount of deviation of the object image position, upon completion of an operation of the first actuator.

20. The optical axis correction apparatus according to claim 18,
wherein the driving of the second actuator can be selectively turned ON and OFF, and
wherein the driving of the second actuator also utilizes the calculated amount of deviation when determining an amount of driving of the one of the plurality of optical elements necessary for canceling the image shake, when the driving of the second actuator has been turned ON.

* * * * *